US005866642A

United States Patent [19]

McVay et al.

[11] Patent Number: 5,866,642
[45] Date of Patent: Feb. 2, 1999

[54] REACTIVE PHENOLIC RESIN MODIFIER

[75] Inventors: Ted M. McVay, Stone Mountain; Gene F. Baxter, Lithonia; Frederick C. Dupre, Jr., Atlanta, all of Ga.

[73] Assignee: Georgia-Pacific Resins, Inc., Atlanta, Ga.

[21] Appl. No.: 63,056

[22] Filed: May 19, 1993

Related U.S. Application Data

[63] Continuation of Ser. No. 713,256, Jun. 13, 1991, abandoned.

[51] Int. Cl.$^6$ .............................. C08J 3/00; C08K 11/00; C08L 97/00; C08L 99/00
[52] U.S. Cl. ............................. 524/74; 524/13; 524/14; 524/15; 524/72; 524/73; 524/596; 524/702; 524/841; 527/403
[58] Field of Search ................................. 524/13, 14, 15, 524/72, 73, 74, 596, 702, 841; 527/403

[56] References Cited

U.S. PATENT DOCUMENTS

| | | | |
|---|---|---|---|
| 2,786,008 | 3/1957 | Herschler | 154/132 |
| 2,828,297 | 3/1958 | Glesen | 260/124 |
| 3,017,303 | 1/1962 | Ayers | 154/45.9 |
| 3,076,772 | 2/1963 | Christ | 260/17.2 |
| 3,200,070 | 8/1965 | Herrick | 252/8.5 |
| 3,454,508 | 7/1969 | Herrick | 260/17.5 |
| 3,658,638 | 4/1972 | Ludwig | 161/262 |
| 3,758,405 | 9/1973 | Fremont | 210/23 |
| 3,825,526 | 7/1974 | Forss | 260/124 R |
| 3,864,291 | 2/1975 | Enkvist | 260/17.5 |
| 3,912,706 | 10/1975 | Rachor | 260/124 R |
| 4,105,606 | 8/1978 | Forss | 260/17.5 |
| 4,113,675 | 9/1978 | Clarke | 260/17.5 |
| 4,155,845 | 5/1979 | Ancelle | 210/22 R |
| 4,194,997 | 3/1980 | Edler | 260/17.5 |
| 4,303,562 | 12/1981 | Hollis | 260/17.5 |
| 4,306,999 | 12/1981 | Adams | 260/17.5 |
| 4,357,454 | 11/1982 | Holmberg | 527/403 |
| 4,423,173 | 12/1983 | Janiga | 524/14 |
| 4,514,532 | 4/1985 | Hsu | 524/14 |
| 4,584,057 | 4/1986 | Rowe | 162/16 |
| 4,670,098 | 6/1987 | Thorsell | 162/29 |
| 4,769,434 | 9/1988 | Van der Klashorst | 527/403 |

FOREIGN PATENT DOCUMENTS 1 601 751  10/1989  United Kingdom .

OTHER PUBLICATIONS

Odian, George, *Principles of Polymerization* Second edition, 1981 pp. 20–24.
Karatex Adhesive Brochure (Undated).

Beder, "Removal of Solutes From Mill Effluents by Reverse Osmosis", Tappi Journal vol. 53, Issue No. 5 (1970) pp. 883–887.

Olsen, "Membrane Technology in the Pulp and Paper Industry", Desalination, vol. 35, (1980) pp. 291–303.

Forss, "Pulp and Paper Industry–An Unexploited Field for Membrane Technology", The Finnish Pulp and Paper Research Institute, (1982) pp. 1–23.

Allen, "Ultrafiltration Studies on Alkaline Pulping Liquors", Cellulose Chemistry and Technology, vol. 20 (1986) pp. 417–420.

Kirkman, "Kraft Lignin recovery by Ultrafiltration: Economic Feasibility and Impact on the Kraft Recovery System", Tappi Journal, vol. 69, Issue No. 5 (1986) pp. 110–114.

Gardner, "Formulation of a Lignin–Based Plywood Adhesive From Steam–Exploded Mixed Hardwood Lignin", Forest Product Journal, vol. 36, No. 5 (1986) pp. 61–67.

Woener, "Ultrafiltration of Pulp Mill Liquors", Tappi Journal, (1987) pp. 126–130.

De Groote, "The Sulfomethlation of Lignin", Tappi Journal (1987) pp. 139–140.

Olivares, "Kraft Lignin Utilization in Adhesives", Wood Sci. Technol. vol. 22 (1988) pp. 157–165.

Gillespie, "Durable Wood Adhesives From Kraft Lignin", American Chemical Society, Chapter 9 (1989) pp. 112–125.

Lora, "Characteristics and Potential Applications of Lignin Produced by an Organosolv Pulping Process", American Chemical Society, Chapter 23 (1989) pp. 312–323.

Cook, "Organosolv Lignin–Modified Phenolic Resins", American Chemical Society, Chapter 24 (1989) pp. 324–333.

Hill, "Ultrafiltration Studies On a Kraft Black Liquor", Tappi Journal, vol. 67: No. 6 (1984) pp. 100–103.

Forss, "Finnish Plywood, Particleboard, and Fiberboard Made With a Lignin–Base Adhesive", Forest Products Journal, vol. 29, No. 7 (1979) pp. 39–43.

*Primary Examiner*—Patrick D. Niland
*Attorney, Agent, or Firm*—Banner & Witcoff, Ltd.

[57] ABSTRACT

A low molecular weight lignin fraction having a pre-selected molecular weight range prepared from lignin solution by ultrafiltration. The invention also relates to phenol-formaldehyde resin modified by the lignin fraction, adhesive comprising the modified resin, and a method for producing the lignin fraction and the resin.

9 Claims, No Drawings

5,866,642

REACTIVE PHENOLIC RESIN MODIFIER

This is a continuation of application Ser. No. 07/713,256, filed Jun. 13, 1991 now abandoned.

TECHNICAL FIELD

The present invention relates to a reactive phenolic resin modifier. More particularly, this invention relates to a reactive lignin and to resins prepared using such lignin which are highly cross linked during cure.

BACKGROUND OF THE INVENTION

Phenol, one of the main components of phenolic resins, is a relatively expensive petrochemical. Because phenol is a petrochemical, its market price fluctuates with crude oil prices. Since crude oil prices have been and are expected to remain high, there continues to be an impetus to find non-petrochemical based replacements for raw materials, such as phenol, derived from crude oil.

A major use of phenol is in the manufacture of phenol-formaldehyde resins. Such resins are used in large quantities as adhesives, coatings, fillers and the like in the manufacture of plywood, particle board and other composite wood products. Due to the high cost of the raw materials derived from petrochemical sources, such adhesives, coatings, fillers and the like are relatively expensive, relative to the value of the finished product. For these reasons, there is a strong economic incentive to replace as much of the phenol as possible with a less costly modifier that does not detract from the resin performance.

Because of the similarity of its chemical structure to phenolic resins, numerous proposals have been made to modify kraft lignin, among other lignins, by reaction with chemicals which promote cross linking of the lignin molecules. Kraft lignin is a by-product of a particular alkali wood pulping process, the Kraft process. Such cross linked lignins may be used as modifiers in phenolic resins. One of the drawbacks of the prior art, which has limited the use of such modified lignins, is that large amounts of phenol still must be used to produce a resin with suitable properties. Large amounts of phenol are required because the reactivity of the lignin molecules is relatively low. It also has proved difficult to effect sufficient cross linking between the lignin and the phenol-formaldehyde resin to achieve good resin properties, and in particular properties of composite wood products certified for exterior use.

U.S. Pat. No. 3,017,303 describes the use of purified alkali lignin as a modifier for phenolic plywood resins. U.S. Pat. No. 3,658,638 discloses lignosulfonate as a phenol replacement in an adhesive resin made by co-condensing lignosulfonate, phenol and formaldehyde. U.S. Pat. No. 3,864,291 describes a plywood adhesive made by reacting black liquor of the kraft or soda alkaline pulping processes with formaldehyde and then blending this adduct with a phenol-formaldehyde resin. U.S. Pat. No. 4,113,675 similarly describes an adhesive prepared by reacting lignin from kraft or soda black liquor with formaldehyde under alkaline conditions followed by cross linking with a phenol formaldehyde resin. U.S. Pat. No. 4,303,562 describes an alkali lignin-based adhesive prepared by adding a phenol-water-lignin solution to a partially condensed phenol-formaldelhyde resin and then reacting the mixture under alkaline conditions. Unfortunately, with all of the above methods the low level of lignin reactivity severely limits the relative amount of lignin that can be added to the resin (and correspondingly the amount of phenol that can be replaced).

U.S. Pat. No. 4,105,606 purportedly overcomes this problem by using a high molecular weight alkali lignin isolated for example by ultrafiltration. According to the '606 patent, the initial lignin should be treated to recover a lignin fraction in which at least 40 wt. percent of the lignin has a molecular weight in excess of that of Glucagon as determined by gel chromatography. Stated in an alternative fashion, the patent teaches the removal of the low molecular weight lignin fraction and the use of the remaining high molecular weight lignin fraction (at least 45 percent of the lignin should have molecular weights in excess of 5,000) as an improved lignin modifier for phenol. There is no discussion as to any utility of the low molecular weight fraction. In fact, with the disclosure of "at least 35 percent, properly over 40 percent or 45 percent, and preferably over 50 percent by weight of the alkali lignins shall have molecular weights in excess of 5,000 as determined by gel chromatography" (or alternatively, "at least 40 percent, properly over 45 percent or 50 percent and preferably over 55 percent by weight of the alkali lignins have molecular weights in excess of that of Glucagon") this patent indicates that the lignin molecular weights should be as high as possible.

The use of ultrafiltration to remove or recover constituents from black liquor also is known in the art. U.S. Pat. No. 3,758,405 describes a process using ultrafiltration to remove color from black liquor. The liquor is ultrafiltered through a membrane with a pore size of from about 0.01 to 0.05 micron and the color components are recovered in the concentrate. U.S. Pat. No. 4,155,845 describes a process wherein the waste wash liquor of chlorine bleaching and sodium hydroxide bleaching operations is ultrafiltered after the addition of a flocculating agent. U.S. Pat. No. 4,670,098 describes a pulping process in which the pulping liquid is subjected to ultrafiltration during the pulping operation to remove constituents having a molecular weight above 3,500, preferably above 2,000 and most preferably above 1,500. The pulping liquid, from which the higher molecular weight constituents have been removed, is returned to the pulping process. The recovered concentrate, which contains the higher molecular weight constituents, is said to contain mostly lignin materials and is said to have various uses. The solids content of this concentrate, obtainable by evaporation or spray drying, is said to be useful, inter alia, in the preparation of adhesives.

Low molecular weight lignin-containing by-products obtained by pulping of wood, typically hardwood, in an aqueous ethanolic liquor have been substituted for phenol in phenol-formaldehyde resins used for bonding maple blocks. An aqueous mixture of the lignin was reacted with the quantity of phenol required to form the resin. Then, the formaldehyde was added. The resulting resin was used as the bonding agent for the blocks.

SUMMARY OF THE INVENTION

This invention relates to a low molecular weight lignin fraction having a pre-selected molecular weight range separated from lignin-containing solution by ultrafiltration. The invention also relates to a phenol-formaldehyde resin modified by the lignin fraction, an adhesive comprising the modified resin, and a method for producing the lignin fraction and the resin.

DETAILED DESCRIPTION OF THE INVENTION

Skilled practitioners recognize that black liquor resulting from kraft pulping of a lignin-containing source comprises lignin and other compounds, such as color bodies and pulping chemicals. Typically, kraft pulping is carried out on soft woods, such as conifers, including southern pine. Kraft pulping also can be carried out on hard woods, such as oak, maple, and other deciduous woods. The invention is directed to ultrafiltration of black liquor from kraft pulping of any species of wood to obtain the desired low molecular weight lignin fraction. Lignin solids can be separated from black liquor by known methods, such as acid precipitation. The invention also is directed to ultrafiltration of an aqueous solution of lignin solids obtained from black liquor from kraft pulping any species of wood, from which a low molecular weight fraction can be separated by ultrafiltration to yield a low molecular weight fraction which satisfies the reactivity criteria set forth herein. For convenience, however, this invention is described with particularity with respect to a preferred embodiment, i.e., ultrafiltration of black liquor from kraft pulping of southern pine wood.

Lignin from sources other than wood also is suitable for use in the method of the invention, provided that a low molecular weight fraction can be separated from the whole lignin by ultrafiltration and that the low molecular weight fraction satisfies the reactivity criteria set forth herein. For example, a low molecular weight lignin fraction can be obtained by subjecting whole bagasse lignin, a by-product obtained from the extraction of juice from sugar cane, to ultrafiltration to yield a desired low molecular weight lignin fraction.

For the purposes of this invention, a low molecular weight lignin fraction is suitable for modification of a phenol-formaldehyde resin if the reactivity of the fraction is at least about 8 percent with regard to either phenol or formaldehyde.

To determine formaldehyde reactivity of a lignin, 50 grams of lignin is dissolved in a sufficient quantity of 5 percent aqueous sodium hydroxide solution to yield a lignin solids concentration of between about 15 and 20 percent. After the pH of the lignin solution is adjusted to 10.6 (essentially to supress the Cannizzaro reaction, as described herein) by addition of dilute acetic acid or dilute base (NaOH), the volume is adjusted to 500 ml by addition of distilled water. One hundred ml aliquots are cooled, if necessary, to a temperature below about 25° C. to preclude premature reaction of formaldehyde (reaction will not occur at a temperature below about 25° C.). To each, one-third mol of formaldehyde is added in the form of either 50 percent formaldehyde aqueous solution or formalin (37 percent aqueous solution). The concentration of free formaldehyde is determined by the known hydroxylamine hydrochloride method, which is familiar to skilled practitioners. After the concentration of free formaldehyde has been determined, the aliquots are heated to 60° C., held at this temperature for 4 hours, then cooled to a temperature below 25° C. The free formaldehyde concentration then is calculated by dividing the difference between the formaldehyde concentration before reaction and the formaldehyde concentration thereafter by the dry weight of the lignin in the aliquot (here, one-fifth of 50 grams, or 10 grams).

To determine the phenol reactivity of lignin, the pH of an aqueous solution of 50 grams of lignin in water containing 5 percent sodium hydroxide is adjusted to between about 7.5 and about 11. Then, the volume is adjusted to 500 ml, from which are withdrawn 100 ml aliquots. The aliquots are cooled to below about 25° C. A quantity of phenol at least equal to the mass of the lignin is added thereto. The concentration of phenol in each aliquot is immediately determined, and is redetermined after the reaction period, by any known method of phenol analysis. The temperature is raised to 90° C., at which temperature the lignin and phenol react. This temperature is maintained throughout the four-hour reaction period, then the samples are cooled to 25° C. The phenol reactivity is calculated by multiplying the difference between the concentration of free phenol before and after reaction by the weight of the reactant solution after phenol addition and dividing by the weight of lignin in the aliquot (here, one-fifth of 50 grams, or 10 grams).

Phenol-formaldehyde resins useful in the present invention commonly are referred to as resoles and constitute thermosetting condensation products produced by reacting at least one mol of formaldehyde with each mol of phenol. Particularly preferred phenol-formaldehyde condensation products are prepared using a molar ratio of phenol to formaldehyde of about 1:1.5 to 1:3 with a phenol to formaldehyde molar ratio of about 1:2 most often used.

According to the present invention, phenol-formaldehyde resins to be used in the manufacture of adhesives for composite wood products such as plywood, fiberboard, and particle board, are prepared by replacing at least a portion of the phenol, the formaldehyde, or both, with a particular ultrafiltered lignin product. It has surprisingly been discovered that by co-reacting a particular molecular weight fraction of lignin into a phenol-formaldehyde resin, one can obtain a high performance resin for use in such adhesives. In such a high performance resin of the invention, a greater amount of phenol, formaldehyde, or both, is replaced by lignin as compared with known prior art approaches to preparation of adhesives having comparable characteristics. In contrast to U.S. Pat. No. 4,105,606 which teaches the use of a higher molecular weight fraction of lignin, the present invention is directed to the use of a lower molecular weight fraction of the lignin for replacement of phenol, formaldehyde, or both, in modified phenol-formaldehyde resins.

One well-recognized problem with prior art lignin-modified phenolic resins is that the lignin-modified resins tend to cure more slowly than their unmodified standard resin counterparts. While not wanting to be bound by theory, it is thought that this results, in part, from the lignin's viscosity contribution to the ultimate viscosity of the phenol-formaldehyde resin. Standard (unmodified) phenol-formaldehyde resins are typically reacted, or "cooked", to a pre-selected viscosity endpoint, which generally corresponds to a desired phenol-formaldehyde resin of a particular molecular weight. The degree of polymerization of the phenol-formaldehyde resin corresponding to this viscosity end point determines its final cure time or cure speed. Stated otherwise, comparing two resins of similar viscosities, the one that is more advanced (i.e., further cured) will tend to reach a final stage of cure more quickly.

When a whole kraft lignin is used to modify a phenolic resin, it has been observed that the lignin, which itself has a relatively high viscosity, contributes disproportionately to the final resin viscosity. Therefore, when reacting such a modified resin to the same viscosity endpoint as an unmodified resin, the actual molecular weight of the phenol-formaldehyde resin portion of the modified resin is considerably lower than (i.e. the phenol-formaldehyde resin is less advanced) the desired molecular weight, i.e., the molecular weight of an otherwise comparable but unmodified resin. Thus, the phenolic resin portion of the whole lignin-modified resin has to be further polymerized, i.e., to a greater extent relative to the standard unmodified resin, during curing to reach a state of complete cure. Unfortunately, if one attempts to avoid this dilemma by reacting the modified resin further until the phenol-formaldehyde resin portion has the desired molecular weight, then the final viscosity of the modified resin tends to be so high (due to the lignin viscosity contribution) as to make the resin unmanageable, or to cause dry-out of plywood adhesive comprising the resin.

According to the present invention, a low molecular weight fraction of kraft lignin, or of whole bagasse lignin, is isolated and is used to modify a phenol-formaldehyde resin. This low molecular weight lignin fraction has a correspondingly lower viscosity, and hence makes less of a contribution to the viscosity of the modified phenol-formaldehyde resin. Thus, using the lignin of the present invention, phenol-formaldehyde resins can be modified to a greater extent before experiencing a large viscosity increase than when using a prior art lignin source. The lignin-modified resins of the invention therefore are advanced to much the same extent as their unmodified counterparts and thus exhibit cure speeds similar to those of unmodified resin, rather than the retarded cure speed (or greatly increased cure time) typical of whole lignin modified phenol-formaldehyde resins.

A second advantage the lower molecular weight kraft lignin fraction of the present invention over whole lignin known in the prior art is that the lower molecular weight fraction is apparently more reactive than whole lignin or the higher molecular weight fraction. That is, the lower molecular weight lignin will more readily react with formaldehyde or phenol, and thus become an integral part of the phenol-formaldehyde resin. This also contributes to a faster curing lignin modified phenol-formaldehyde resin, with characteristics relevant to use in composite wood products certified for exterior use comparable to those of unmodified resins.

The low molecular weight lignin fraction useful in preparing the modified lignin of the present invention is obtained by and thus characterized by a two-stage ultrafiltration process through which the desired lignin fraction is separated from black liquor, i.e., the aqueous lignin-containing by-product mixture remaining from kraft pulping of wood, from kraft lignin solution, or from whole bagasse lignin. In the first stage, an upper molecular weight limit is established by ultrafiltration through a first molecular weight cut-off (MWCO) membrane. The desired lignin fraction is derived from the filtrate from this first ultrafiltration step. The filtrate from the first ultrafiltration subsequently is ultrafiltered a second time through a significantly lower MWCO membrane. The desired lignin fraction then is the retentate from this second MWCO membrane.

The upper MWCO of the lignin fraction has a significant effect on the molecular weight, and hence to the viscosity, of the fraction. As a skilled practitioner will recognize, the viscosity of the lignin fraction will be affected not only by the identity of the wood, but also by the solids concentration of the lignin fraction. Further, although a higher molecular weight cutoff membrane would, when operated under identical conditions, provide a greater yield of low molecular weight lignin, the viscosity of the resulting lignin fraction (and of the resulting modified resin) also would increase.

In accordance with the guidance provided herein, skilled practitioners will be able to establish an appropriate upper MWCO for the lignin solution being subjected to ultrafiltration. For example, use of a 100,000 MWCO membrane to ultrafilter black liquor from the kraft method of pulping southern pine wood typically may produce a larger yield of low molecular weight lignin than does a 50,000 MWCO membrane operated under identical conditions. However, the viscosity of the resulting −100,000 MWCO lignin filtrate is significantly higher than the viscosity of the −50,000 MWCO lignin filtrate at equal pH, temperature, concentration factor, and solids concentration. The molecular weight also is higher, and reactivity is lower. Therefore, when processing black liquor from the kraft pulping of southern pine, a 50,000 MWCO is preferred.

The actual molecular weight of the lignin filtrate for a given membrane varies with operating conditions, including pressure, pH, temperature, concentration factor, and solids concentration. For example, increasing the concentration factor increases the molecular weight of the molecules which permeate the membrane. The behavior of lignin fractions subjected to ultrafiltration is affected by the tendency of the lignin molecules to associate, as described in an article by Rudatin, S., Y. L. Sen, and D. L. Woerner, "Association of Kraft Lignin in Aqueous Solution," from *Lignin: Properties and Materials,* ACS Symposium No. 397 (1989), at pages 144–154, the relevant portions of which are incorporated herein by reference.

In accordance with the method of the invention, the ultrafiltration is operated in a fashion so that the resulting low molecular weight lignin fraction of the invention has a composition in which more than 60 wt percent of the lignin molecules have a molecular weight which does not exceed the molecular weight of Glucagon and more than 65 percent of the lignin molecules have a molecular weight which does not exceed 5,000, as determined by gel chromatography. One appropriate gel chromatography method is described by Whitaker, J. R., Anal. Chem. Vol. 35, No. 12, November 1963, pages 1950–1953; Forss, K. G. and B. G. Stenlund, Paper and Timber 48 (1966), Vol. 9, pages 565–574 and Vol. 11, pages 673–676; and Forss, K. G., B. G. Stenlund, and P. E. Sfors, Applied Polymer Symposium No. 28, 1185–1194 (1976), published by John Wiley & Sons, Inc. In the method, test samples are eluted through a gel chromatography column. The molecular weight distributions are determined on the basis of a correlation between the molecular weights and corresponding retention volumes. This correlation can be established by determination of the molecular weights of the different fractions by means of the light-scattering method, osmometry, or ultracentrifugation techniques. However, these methods are very tedious, and for practical purposes it is therefore appropriate to calibrate the gel chromatography column with the aid of easily available substances with known molecular weights.

Any criticality in the lower limit on the molecular weight of the lignin fraction is linked to the presence of undesired pulping chemicals or other objectionable low molecular weight impurities in the lignin. The lignin fraction preferably is further treated in a second ultrafiltration step to remove pulping chemicals and impurities. The pulping chemicals pass through the membrane, and typically are returned to the pulpmill for recovery and reuse. Impurities may be discarded. The retentate, or low molecular weight lignin fraction that is rejected by the second MWCO membrane, is the desired lignin fraction and is recovered as the kraft or bagasse low molecular weight lignin product in accordance with the present invention.

Because the objective of the second ultrafiltration step is merely to remove these materials, a membrane with the lowest possible MWCO is preferred; a small-MWCO membrane will give the highest yield of lignin. However, the MWCO size should be selected to provide flux rates conducive to providing the desired production rate of lignin. Thus, the selection of the molecular weight at which the second ultrafiltration is carried out is as much a business and economic selection as it is a technical selection. For example, a 2000 MWCO polysulfone membrane from DDS (De Danske Sukkerfabrikker) typically provides a suitable balance between flux rates (operability of the system) and yield of lignin for removal of kraft pulping chemicals from southern pine lignin. Membranes having 750 MWCO also may be suitable for use in the claimed invention. With the guidelines provided herein, skilled practitioners will be able to select appropriate lower MWCO membranes which remove pulping chemicals yet reject lignin.

The sequence by which the lignin solution is subjected to ultrafiltration, i.e., first, through the upper MWCO membrane, then the filtrate thereof through the lower MWCO membrane, is preferred for a number of reasons recognized by a skilled practitioner. For example, this sequence minimizes the total volume of fluid which must be ultrafiltered. The reverse sequence of ultrafiltration, i.e., first through the lower MWCO membrane, then the retentate thereof through the upper MWCO membrane, to yield the desired lignin fraction as the filtrate from the upper MWCO membrane, also is acceptable in the practice of the method of the invention. However, this method is inefficient, because of the larger volume of fluid which must be treated, and exposes the lower MWCO membrane to particulate matter which the upper MWCO membrane would have retained.

In particular, ultrafiltered southern pine kraft lignin of the invention is prepared, first, by passing southern pine kraft black liquor through a DDS polysulfone membrane identified as GR51PP, which has an approximate MWCO of 50,000. The low molecular weight fraction that passes through the membrane contains the desired lignin fraction. The high molecular weight fraction,. which is rejected by the membrane, is discarded, typically by returning it to the pulpmill black liquor recovery system. Then, the filtrate is subjected to a second ultrafiltration with a DDS GR90PP polysulfone membrane, which has an approximate MWCO of 2000, to remove pulping chemicals.

Membranes and apparatus utilized in the ultrafiltration step may comprise any composition of matter and any appropriate design suitable for the intended purpose. For example, either plate and frame or radial-type construction is suitable.. As skilled practitioners recognize, plate and frame construction affords the opportunity to remove a plate and frame assembly for servicing with a minimum of disruption of service. Therefore, plate and frame construction is especially suitable for the upper MWCO membrane assembly, which may be subject to fouling by solids in the black liquor. However, radial construction cannot be opened for cleaning. Thus, although radial construction is not preferred under circumstances which frequent blockage of the membrane is likely, radial construction is especially suitable for the lower MWCO membrane assembly, which is less likely to be subjected to fouling by solids.

The membrane can comprise any composition of matter which will not suffer deleterious effects under the conditions of contact with the black liquor. For example, kraft black liquor from pulping of southern pine, which has a pH of about 13, may be ultrafilted at a temperature of about 80° C., the temperature at which it typically is received from the kraft plant. Although cellulosic, fluoropolymer, and other membranes may be suitable under certain circumstances, such as lower temperature or lower pH, polysulfone is preferred. Polysulfone membranes are the most durable membranes known to the inventors. Polysulfone is significantly more resistant to the high pH and temperature at which black liquor often is ultrafiltered than are the other membranes.

According to the present invention, the low molecular weight lignin fraction isolated from the whole Kraft lignin by ultrafiltration is first activated, i.e., modified to improve its ability to copolymerize with phenol-formaldehyde resins. Activation of lignin from southern pine, other soft woods, and bagasse comprises two steps: first, hydroxymethylation (also known as methylolation) of the low molecular weight lignin fraction, followed by phenolysis of the hydroxymethylated lignin. In contrast, hardwood lignins would first be treated with phenol, then with formaldehyde.

According to the method of the invention for activating lignin from softwoods and bagasse, the low molecular weight lignin is reacted in an aqueous system with formaldehyde. The mass ratio of lignin solids to formaldehyde is typically in the range of about 1:4.5 to about 1:0.15, preferably in the range of about 1:4.5 to about 1:0.6, and more preferably in the range of about 1:3.5 to about 1:2.5.

Preferably, the reaction is conducted under conditions which retard the Cannizzaro reaction (reaction of formaldehyde with caustic to form methanol and sodium formate) by maintaining the reaction pH less than or equal to about 10.6. Many lignin fractions have a pH exceeding about 10.6. In particular, the preferred lignin fraction obtained by ultrafiltration of kraft black liquor from pulping of southern pine has a pH between about 11.5 and about 12.5. The pH can be reduced, for example, by addition of any suitable acid, such as hydrochloric acid.

Reaction of lignin with formaldehyde at a pH above about 10.6 merely wastes formaldehyde in the unproductive Cannizzaro reaction until the products of the reaction lower the pH to less than or equal to about 10.6. Therefore, to avoid waste of formaldehyde, the lignin and formaldehyde are typically reacted at a pH in the range between about 8 and about 10.6, preferably in the range between about 9.6 and about 10.6. This hydroxymethylation reaction typically is performed at atmospheric pressure, typically at a temperature in the range of about 55° C. to about 70° C., preferably at a temperature in the range of about 60° C. to about 65° C. The hydroxmethylation reaction is allowed to proceed to completion, as determined by measuring residual free formaldehyde in accordance with known methods. Complete reaction typically takes from about 50 minutes to about 70 minutes.

The hydroxymethylated lignin then is reacted with a quantity of phenol sufficient to complete the activation and copolymerize the lignin into a phenol-formaldehyde resin. The hydroxymethylated lignin is reacted with a quantity of phenol sufficient to produce, upon addition of any additional formaldehyde which may be required, a modified resole resin having the desired molar ratio of phenol to formaldehyde of about 1:at least about 1. This phenolysis reaction typically is carried out at a pH between about 9 and about 11.5, preferably at a pH less than or equal to about 10.6, and more preferably in the range of about 10 to about 10.6. The phenolysis reaction typically occurs at atmospheric pressure in the temperature range of about 60° C. to about 100° C., preferably in the temperature range of about 70° C. to about 80° C.

Activation of a hardwood lignin is carried out in an aqueous system with phenol. The mass ratio of lignin solids to phenol is typically in the range of about 1:14.5 to about 1:0.5, preferably in the range of about 1:14.5 to about 1:0.9, and more preferably in the range of about 1:11 to about 1:7.9.

Phenolysis is carried out by adding the phenol to the aqueous lignin solution, and typically is carried out at atmospheric pressure. The temperature typically is between about 60° C. to about 100° C., preferably in the range of about 70° C. to about 80° C. The phenolysis reaction may be carried out at a pH of between about 7.5 and 11, preferably between about 9 and 10.5.

In preparing typical phenol-formaldehyde resole resins, formaldehyde is reacted with phenol in an aqueous reaction medium in the presence of an alkaline catalyst. For economic reasons, sodium hydroxide is the alkaline catalyst of choice in the present invention. However, alkaline potassium catalyst or other alkaline metal catalysts may be used according to the art.

A variety of techniques is known in the art for reacting phenol and formaldehyde in the presence of the alkaline catalyst. Typically, the resin is reacted in stages with separate partial additions of either one or both of the reactants and the alkaline catalyst. For example, one common procedure is to react the phenol with portion of the formaldehyde, in the presence of a portion of the alkaline catalyst. After a brief, initial exothermic reaction, additional amounts of alkaline catalyst and formaldehyde are added to the reacting mixture and the reaction is continued with careful control of the reaction temperature. Once all of the reactants and catalyst have been added, the reaction is allowed to proceed to a suitable end point, which may be determined by measuring the refractive index of the reacting mixture, by measuring the viscosity of the reacting mixture, or by some combination thereof, as recognized by those skilled in the art. Once the selected end point is achieved, the reaction mixture is cooled and the resin is ready for preparing an adhesive mixture.

An amount of sodium hydroxide is added during the preparation of the resin to produce a resole resin solution having an alkalinity content, i.e. an amount of alkaline catalyst, in the range of about 1 percent to about 15 percent, preferably about 3 percent to about 9 percent, and most preferably about 4 percent to about 8 percent based on the weight of the resole resin solution. As used herein alkalinity content means the content of alkaline catalyst expressed as a percent of a solution according to the equivalent weight of sodium hydroxide. Normally, from about 50 mol percent of sodium hydroxide up to about 100 mol percent of sodium hydroxide based on the mols of phenol used in preparing the resole resin will provide the desired level of alkalinity. Preferably about 0.60 mol to about 0.80 mol of sodium hydroxide per mol of phenol is used.

Preferably, hydroxybenzene (phenol) is the phenol reactant of choice, although substituted phenols such as cresol and higher functional phenols such as resorcinol, bisphenol-A, or bisphenol-F can be used. Formaldehyde is the preferred aldehyde constituent. Generally, the formaldehyde is supplied as an aqueous solution known in the art as "formalin." Formalin generally contains from about 37 percent to about 50 percent by weight formaldehyde. Other forms of formaldehyde such as paraformaldehyde also can be used. Other aldehydes, which may be used in lieu of or in combination with formaldehyde, include aliphatic aldehydes such as acetaldehyde and propionaldehyde; aromatic aldehydes such as benzylaldehyde and furfural and other aldehydes such as aldol, glyoxal, and crotonaldehyde.

According to the present invention, lignin activated by hydroxymethylation is copolymerized into such a resole resin by adding alkaline catalyst and a quantity of formaldehyde sufficient to form the resole resin and activate the lignin, heating to a temperature in the range of about 70° C. to about 100° C., and reacting until the viscosity reaches the desired end point. Typically, water will be added also to achieve the desired solids content. The resulting lignin-phenol-formaldehyde resin is fast curing and produces a strong bond with wood. Alternatively, the hydroxymethylated lignin is directly copolymerized into a phenol-formaldehyde plywood resin. Analogously, lignin activated by phenolysis is copolymerized into such a resole resin by adding alkaline catalyst and a quantity of formaldehyde sufficient to form the resole resin and activate the lignin, heating to a temperature in the range of about 70° C. to about 100° C., and reacting until the viscosity reaches the desired end point. However, it is not contemplated to form modified resin merely by addition of lignin to a previously-prepared phenol-formaldehyde resin.

In a preferred embodiment, the low molecular weight lignin fraction from kraft pulping of southern pine is copolymerized into the phenol-formaldehyde resin in a single stage. This method also comprises the two activation steps, i.e., hydroxymethylation and phenolysis of the lignin; however, enough excess formaldehyde and phenol is added to both activate the lignin and to form the resin in situ. Preferably, the reaction is conducted under conditions which retard the Cannizzaro reaction (reaction of formaldehyde with caustic to form methanol and sodium formate) by maintaining the reaction pH less than or equal to about 10.6. The reaction of lignin and formaldehyde typically is carried out at a pH at least about 9, preferably at a pH less than or equal to about 10.6, and more preferably in the range of about 10 to about 10.6. This hydroxymethylation reaction is typically performed at atmospheric pressure typically at a temperature in the range of about 55° C. to about 70° C., preferably in the range of about 60° C. to about 65° C. The hydroxmethylation reaction is allowed to proceed to completion, which typically takes about 20 minutes to about 180 minutes, preferably about 30 to about 60 minutes.

The hydroxymethylated lignin with excess formaldehyde then is reacted with a quantity of phenol sufficient to complete the activation of the low molecular weight lignin and to complete the polymerization of the lignin modified phenol-formaldehyde resin. The hydroxymethylated lignin is reacted with the phenol, typically at a pH between about 9 and about 11.5, preferably at a pH less than or equal to about 10.6, and more preferably in the range of about 10 to about 10.6. The phenolysis reaction typically occurs at atmospheric pressure in the temperature range of about 70° C. to about 100° C., preferably in the temperature range of about 80° C. to about 90° C. The phenolysis reaction is allowed to proceed to a predetermined viscosity, depending on the total solids content of the reaction mixture.

At the desired end point, the polymerization reaction is stopped by rapidly cooling the lignin-phenol-formaldehyde resin, preferably to a temperature below about 38° C., most preferably to a temperature below about 27° C.

The low molecular weight southern pine lignin modified resins of the present invention may result in about 25 percent phenol replacement and about 15 percent formaldehyde replacement by lignin. Other lignins may provide even greater replacement values.

The process of making lignin modified resole resin of the present invention is directly adaptable to equipment conventionally used for making phenol-formaldehyde resole resins. As noted above, the reaction is conducted in aqueous solution. Normally, the reaction is conducted so that the ultimate resole resin has a non-volatile material (NVM) content of at least about 35 percent by weight based on the weight of the resole resin solution. NVM contents of up to about 55–60 percent are possible, although it is preferred that the NVM content not exceed about 50 percent in order to avoid solutions that have such high viscosities that they present problems in mixing and pumping. Preferably, resole resin solutions useful in preparing adhesives for making plywood have an NVM content of between about 40 percent and 48 percent by weight, and more preferably between about 40 percent and 44 percent by weight. NVM content can be determined in any suitable manner known to skilled practitioners, such as heating at 125° C. for about 2 hours.

To use the lignin modified resole resin of the present invention in the manufacture of a wood composite such as plywood, it is common to blend the resin with additional ingredients to prepare an adhesive. In addition to the resin solution itself, which constitutes the major component of the adhesive mixture (generally from about 40 to 80 percent by weight of the adhesive), it is common to include various fillers, i.e., inert materials added to increase the weight of the adhesive mixture, adhesive extenders, additional caustic, and other additives. Generally, a suitable adhesive will contain from about 22 to 36 percent resin solids, from about 3 to 7 percent fillers, from about 3 to 7 percent extenders, and from about 1 to 3 percent additional alkaline catalysts. Suitable fillers and extenders include starch, wood, flour, nut shell flour, bark products or agricultural residues, clays, and corn husks. Starch and clays generally are used as fillers, often in amounts of 1 percent to 10 percent based on the weight of the resin solids.

This invention also contemplates a method for the manufacture of glued wood products comprising using the adhesives of this invention to bond together wood veneers or wood particles. Composite wood products which may be manufactured using the adhesive composition contemplated by this invention include softwood plywood, hardwood plywood, oriented strand board, chipboard, hardboard, particle board, fiberboard, and LVL (laminated veneer lumber).

The processes for manufacture of softwood plywood, hardwood plywood, oriented strandboard, chip board, hardboard, particle board, fiberboard, and LVL are well-known to those of ordinary skill in the art and fully discussed in the literature. In the method contemplated by this invention, the adhesive of this invention, comprising a lignin-modified phenol-formaldehyde resin, is substituted for the adhesive of the prior art. Other changes in the process comprise only minor adjustments of process variables to optimize the process, and are routine matters within the skill of the ordinary worker.

In accordance with one process of the present invention, an adhesive mixture is applied to the mating surface of a plurality of wood plys. The amount of adhesive normally depends on the characteristics of the veneer to be bonded and the properties desired in the consolidated panel. The adhesive is applied to the plies generally in an amount of between about 40 to 130 and more preferably in an amount of about 60 to 120 pounds per 1000 square feet of double glue line. The application rates typically will differ with different wood sources. For example, southern pine, which has a higher absorbency capacity than western veneers such as Douglas Fir, requires greater adhesive spreads.

The adhesive mix can be applied to the wood using conventional equipment, including spray nozzles, atomizing wheels, roll coaters, curtain coaters, foam applicators, and the like. Skilled practitioners recognize that additives selected to enhance a particular characteristic of an adhesive mixture of the invention may be blended into the adhesive mixture to improve performance of the mixture with regard to a particular method of application. For example, different additives may be used in an adhesive mixture to be applied by spray nozzles than are used in an adhesive mixture to be applied by curtain coaters.

The various plies are laid-up, i.e., assembled into a panel. After a short period, a panel generally is consolidated initially at an ambient temperature, i.e. at a temperature of from about 15° to 30° C., and at a pressure sufficient merely to assemble the plies into a coherent article. Generally, a pressure in the range of about 25 to 200 pounds per square inch is suitable. The plies are subjected to such pressure until a sufficient initial pre-pressed bond is obtained to keep the plies from separating or coming apart upon release of the pressure. A bond having sufficient strength usually is obtained with a pre-press contact time in the range of about 30 seconds to 20 minutes.

After this initial consolidation, the pressure on the panels is released and they are stored until they are consolidated at an elevated temperature at which the adhesive resin cures. The use of the two step pressing procedure permits easy handling and assembly line type operation. For the final press, the panels are typically consolidated at a temperature within the range of about 90° to 200° C. and at pressures of about 75 to 250 pounds per square inch. The panels are subjected to these press conditions for a time sufficient to cure the adhesive, which for a normal panel construction will require anywhere from about 1 to about 20 minutes.

The period encompassing the lay-up, the time the laid-up assembly stands until the pre-press is carried out, the pre-press period itself, the storage or resting period before the final press, until the product enters the hot press, is known as the total assembly time (TAT). Typically, the TAT is at least about 20 minutes, and can extend to about 3 hours. However, neither the proportion of the TAT which is allotted to each of the steps nor the TAT itself is critical to the invention or forms any part of the invention.

A wide variety of woods can be used for making plywood in accordance with the present invention. Suitable woods include soft woods, such as southern pine, douglas fir, ponderosa pine, and the like, as well as hard woods, such as oak, aspen, walnut, and birch.

A particular advantage of the present invention is that the adhesive can be used for gluing high average moisture content veneers with reduced blowouts and other moisture-induced defects. By using an adhesive according to the present invention, plywood can be prepared from a plurality of veneers having an average moisture content of greater than about 5 percent and up to about 14 percent and higher, with spots of moisture as high as 15–20 percent. Usually, veneer average moisture content is targeted for about 6 percent up to about 11 percent.

The plywood in which adhesive incorporating the lignin-modified resin of the invention is evaluated by the "vacuum pressure" test, known as the V-P test, promulgated by the American Plywood Association (APA). Skilled practitioners recognize that the result of this destructive, layer separation evaluation is expressed in units of "percent wood failure", which is a relative measure of that portion of the adhesive area in which the wood veneer, rather than the adhesive itself, fails. The greater the proportion of wood failure, the stronger the adhesive.

The following examples are for illustrative purposes only and are not meant to limit the claimed invention in any manner. Throughout the examples, 'pbw' means 'parts by weight'.

EXAMPLE 1

Part A—Resin of the Invention

This example describes a formulation and method of making a lignin modified phenol-formaldehyde resin according to the present invention.

In accordance with the subject invention, 36.2 pbw of 23 wt. percent −50,000/+2,000 low molecular weight southern pine lignin obtained from black liquor ultrafiltered in accordance with the invention was blended with 27.0 pbw of 50 percent formaldehyde aqueous solution, and with 0.05 pbw of an antifoaming agent. This blend was reacted at about 60°–65° C. for 1 hour, after which 18.6 pbw of phenol, 4.2 pbw of water, 0.4 pbw of poly-vinyl alcohol, and 0.03 pbw of cetyl alcohol were added. The batch was then cooled to less than about 50° C. The reactor was brought under full vacuum and 2.0 pbw of 50 wt. percent caustic (NaOH) aqueous solution was added. The batch was allowed to exotherm to a temperature of about 79°–87° C., and was kept at that temperature for 20 minutes. Then, an additional 5.0 pbw of 50 wt. percent caustic was added. The batch was allowed to exotherm to about 95°–97° C. and was reacted for 15 minutes.

The batch then was cooled over a 10 minute period to a temperature of about 85°–87° C. and reacted until a Brookfield viscosity of 500 to 700 cps was reached. Subsequently, an additional 3.0 pbw of 50 wt. percent caustic was added as rapidly as possible while maintaining a temperature of about 85°–87° C. Finally, 2.5 pbw of 50 wt. percent caustic was rapidly added while cooling toward a temperature of about 81°–83° C.

The batch then was reacted at a temperature of about 81°–81° C. to a Brookfield viscosity of about 1150 to 1250 cps. The batch was then cooled rapidly to a temperature of about 30°–33° C. during which time 0.05 pbw of an antifoaming agent was added. After cooling, 0.9 pbw of dimethyl sulfoxide was added, followed by mixing.

The resulting resin contained about 43 wt. percent solids, had a Brookfield viscosity of between about 850 and about 1150 cps, and had a pH between about 12.5 and about 12.9.

Part B—Adhesive of the Invention

The lignin modified phenol-formaldehyde resin of Part A was used to prepare an adhesive mix, as follows. First, 15.2 pbw water and 5.1 pbw of cereal flour extender were mixed together. Subsequently, 20.0 pbw of the resin of Part A, 7.6 pbw of a pecan shell extender, 2.0 pbw of 50 wt. percent NaOH, 0.3 pbw Na$_2$CO$_3$, and an additional 49.8 pbw of the resin of Part A were added in turn in the order indicated, with mixing after each addition.

Part C—Comparison of Adhesive of the Invention with Control Adhesive

The adhesive of Part B of this example was utilized to form plywood in accordance with the following method. Veneer having the desired moisture level was coated with adhesive applied by roll spreader at a rate of about 80 pounds per 1000 square feet of double glue line. Thus-coated veneer layers were assembled with uncoated veneer layers to form unbonded assemblies having veneer layers in a desired orientation. The assembled veneers were placed under pressure of about 200 psi at room temperature and a bond having strength sufficient to hold the veneers together during subsequent handling was formed. These assemblies then were stored for a brief period until loaded into the hot press, wherein they were cured at a temperature of 165° C. under a pressure of 200 psi.

A commercially available resin, GP-5773, was utilized to form plywood in accordance with the same method. The resin first was incorporated into an adhesive in accordance with the method of Part B. The adhesive was utilized to form plywood in accordance with the method set forth in Part C.

The wood failure results for duplicative tests are set forth in Table 1 below.

TABLE 1

| | % Wood Failure | | | |
| | Control | | Invention | |
| Press Time, minutes | Test 1 | Test 2 | Test 1 | Test 2 |
|---|---|---|---|---|
| 3 | 88 | 84 | 74 | 67 |
| 2½ | 86 | 86 | 86 | 77 |
| 2¼ | 78 | 41 | 83 | 64 |

EXAMPLE 2

Part A—Resin of the Invention

Southern pine black liquor from a kraft pulp mill was fractionated in accordance with the method of the invention, first with a 50,000 MWCO membrane. The fraction which passed through the membrane then was further fractionated, this time with a 2,000 MWCO membrane. The retentate, i.e., the +2,000/−50,000 fraction of the ultra-filtered lignin, then was utilized to modify a phenol formaldehyde resin in accordance with the method of the present invention.

Formaldehyde (26.3 pbw; 50 percent aqueous solution), hydrochloric acid (0.5 pbw; 15 percent aqueous solution), and ultra-filtered lignin (24.2 pbw of a 30 percent aqueous solution) were mixed in a reaction vessel. The pH of the resulting mixture was 10.6.

The mixture was heated to 60° C., held at this temperature for 2 hour, then cooled to 40° C. Then, 19.2 pbw phenol, 20.7 pbw water, and 0.4 pbw Elvanol 71-30 (polyvinyl alcohol solution available from duPont) were added, together with a quantity of 50 percent sodium hydroxide aqueous solution sufficient to produce a pH of 10.6.

The temperature of the mixture was raised, with heating as required, to between about 95°–97° C. The temperature was held between about 95° C. and 97° C. for about 15 minutes, then was reduced to 87° C. Reaction was continued until the viscosity was about 450 cPs.

A quantity of 50 percent sodium hydroxide aqueous solution sufficient to make the total addition of sodium hydroxide about 9.6 pbw was added. Reaction was continued at a temperature of about 87° C. until the viscosity was about 740 cps. The resin then was cooled.

The resin had a solids concentration of about 43 wt. percent after drying at 125° C. for 2 hours and 0.08 percent free formaldehyde. The viscosity was 740 cPs, and the resin exhibited an alkalinity of 6.45 expressed as percent sodium hydroxide.

Part B—Adhesive of the Invention

The resin of Part A of this example was utilized to manufacture an adhesive by mixing 15.9 pbw water, 5.1 pbw cereal extenders, and 24.0 pbw of the resin of part A of this example. To the mixture were added sequentially and with thorough mixing, 9.7 pbw cereal extended derived from corn cob, 3.0 pbw caustic, 0.2 pbw sodium carbonate, and an additional 42.0 pbw of the resin of Part A.

Part C—Comparison of Adhesive of the Invention with Control Adhesive

The adhesive of Part B of this example was utilized to form plywood in accordance with the method set forth in Part C of Example 1.

A commercially available resin, GP-5779 was utilized to form plywood in accordance with the same method. The resin first was incorporated into an adhesive essentially, in accordance with the method set forth in Part B of this example. Specific alterations to this method and additional information relating thereto are set forth herein.

Then, both the control adhesive and the adhesive of the invention, i.e., Part B of this Example, each was separately applied by rolling at about 80 pounds per 1000 square feet of double glue line to the mating surfaces of 3 plies of veneer and assembled to form ⅛-inch thick assemblies. The moisture content of the wood was about 5.9 percent. The assemblies were consolidated by pressing at 200 psi at 165° C. for the periods set forth in Table 2 below. The pressed assemblies then were cured at 165° C. for 80 minutes.

TABLE 2

| Press Time, minutes | % Wood Failure | |
|---|---|---|
| | Adhesive of Invention | Control Adhesive |
| 2½ | 93.4 | 98.6 |
| 2¼ | 90.2 | 92.9 |
| 2 | 64.2 | 97.4 |
| 1¾ | 14.2 | 53.5 |

This example illustrates the effectiveness of a properly cured adhesive containing +2,000/−50,000 MWCO ultrafiltered lignin.

EXAMPLE 3

Part A—Resin of the Invention

The +2,000/−50,000 MWCO lignin of Example 2, Part A, was utilized to prepare a modified resin in accordance with the claimed invention. Lignin (21.1 pbw), 0.3 pbw 15 percent hydrochloric acid aqueous solution, and 27.9 pbw formaldehyde (50 percent aqueous solution) were blended, heated to 60° C., and held at that temperature for one hour.

To this mixture were added 19.2 pbw phenol, 19.1 pbw water, 0.4 pbw Elvanol, and 3 pbw 50 percent aqueous solution of sodium hydroxide. The temperature was adjusted to 80° C., by heating as required. A second charge of caustic solution, this time 4 pbw, was added, and the temperature adjusted to 90° C. The temperature was maintained at 90° C. for a period sufficient to achieve a viscosity of 150 cPs.

When the viscosity reached 150 cPs, the temperature was reduced to 83° C. Reaction was carried out at this temperature until the viscosity was 450 cps. Then, 3 pbw caustic solution was added, and reaction was continued until the Brookfield viscosity was 600 cPs. Then, 2.6 pbw caustic solution was added. Reaction was continued at 83° C. until a viscosity of about 850 cPs was achieved. Then, the modified resin was cooled to 25° C.

The resin contained about 43 percent solids after oven-drying at 125° C. for 2 hours and 0.12 percent free formaldehyde. The resin exhibited an alkalinity of 7.52 expressed as percent sodium hydroxide and had a viscosity of 860 cPs.

Part B—Adhesive of the Invention

The modified resin of Part A of this example was utilized to manufacture adhesive in accordance with the method set forth in Part B of Example 2.

Part C—Comparison of Adhesive of the Invention with Control Adhesive

The adhesive of Part B of this example was utilized to form plywood in accordance with the method set forth in Part C of Example 1.

A commercially available resin, GP-5779 was incorporated into an adhesive in accordance with the method set forth in Part B of Example 2, and the resin was utilized to form plywood in accordance with the method set forth in Part C of Example 1.

Each adhesive was utilized to make plywood having three veneer plies, each of which contained 12 percent moisture. The results of the destructive V-P test, expressed as percentages of wood failure after various press times, are set forth in Table 3A.

Plywood was manufactured in accordance with the method set forth in Part C of Example 1 from 3 plies of veneer having 2.9 wt percent moisture. Results of the V-P test, expressed as percentage of wood failure, as a function of TAT, are set forth in Table 3B.

TABLE 3A

| Press time, minutes | % Wood Failure | |
|---|---|---|
| | Resin of Invention | Control Resin |
| 4 | 66.1 | 50.0 |
| 3½ | 49.1 | 45.9 |
| 3 | 24.6 | 22.4 |

TABLE 3B

| Ass'y time, minutes | % Wood Failure | |
|---|---|---|
| | Adhesive of Invention | Control Adhesive |
| 30 | 81.6 | 97.7 |
| 60 | 80.1 | 96.9 |
| 120 | 76.4 | 87.2 |

EXAMPLE 4

Part A

Ultrafiltered southern pine lignin of Example 2, Part A, was added in a quantity of 21.1 pbw (40.3 wt percent solids aqueous solution) was mixed with 27.9 pbw formaldehyde (50 percent aqueous solution) in a stirred reaction vessel. While stirring, 0.3 pbw HCl concentrated aqueous solution was added; the resulting pH was 10.7. The mixture was heated to 60° C. and held at that temperature for about one hour. Then, 19.2 pbw phenol, 18.4 pbw water, 0.4 pbw Elvanol 71-30, and 2.5 pbw of caustic (NaOH 50 percent aqueous solution).

The exothermic heat of reaction increased the temperature to about 75° C., at which time an additional 4.5 pbw 50 percent caustic solution was added over a 30 minute period. The reaction batch was cooled to maintain a temperature of about 75° C. to about 85° C. The temperature then was allowed to rise to about 95° C., and was held there for about 20 minutes. The temperature was reduced to about 82° C., and 5.5 pbw additional caustic solution was added. This caustic addition reduced the viscosity of the resin from 720 cPs to about 500 cPs. After 50 minutes at 80° C., the resin viscosity increased to 900 cPs. The temperature of the resin then was reduced to room temperature.

Part B—Adhesive of the Invention

Adhesives comprising the resin prepared in Part A of this example were prepared as follows. Water (15.9 pbw), wheat flour (5.1 pbw), and 24.0 pbw of the resin of Part A of this example were mixed thoroughly. Then, 9.7 pbw Phenofil (a resin extender sold by the Dehyco Company) was mixed in. Three pbw aqueous caustic (50 percent) and 0.24 pbw sodium carbonate were added in turn and thoroughly mixed in. A second portion of resin (42.0 pbw) and 0.1 pbw Nalco 2340 antifoam were added after one minute mixing periods.

As set forth in Table 4 below, Adhesive "LPF" is the adhesive of Part B of this example; Adhesive "DMSO" comprised the adhesive "LPF" with 0.66 pbw DMSO added thereto.

Part C—Comparison of Adhesives of the Invention with Control Adhesive

A control adhesive was made in accordance with the method set forth in Part B of this Example, with the exception that the resin utilized to prepare the adhesive was GP-5779, a commercially-available phenol-formaldehyde resin. This adhesive is labelled "control" in Table 4.

In Table 4, 'Veneer MC' is veneer moisture content, 'TAT' is the total assembly time, and "PT" sets forth the duration in minutes of the period during which pressure of 200 psi was applied to the assembly at a temperature of 165° C.

TABLE 4

| Veneer MC | TAT | PT | Control | LPF | DMSO |
|---|---|---|---|---|---|
| 3.2 | 120 | 2.5 | 71.2 | 78.2 | 84.4 |
| 3.2 | 30 | 2.5 | 85.0 | 79.5 | 86.0 |
| 10.5 | 45 | 4.0 | 86.2 | 82.4 | 86.1 |
| 6.3 | 60 | 2.25 | 92.7 | 94.4 | 91.6 |
| 6.3 | 60 | 3.0 | 92.2 | 90.8 | 87.0 |

EXAMPLE 5

A whole bagasse lignin is ultrafiltered with a 50,000 MWCO membrane. The filtrate then is ultrafiltered with a 2000 MWCO membrane. The retentate from the second ultrafiltration, the desired bagasse lignin fraction, is utilized to prepare a modified resin in accordance with the method set forth in Part A of Example 1. This modified resin then is utilized to prepare an adhesive in accordance with the method set forth in Part B of Example 1. The adhesive is applied to wood veneers to manufacture plywood to be certified for exterior use.

EXAMPLE 6

Black liquor from the kraft method of pulping southern pine wood was ultrafiltered through a DDS GR51PP polysulfone membrane having approximately a 50,000 MWCO. The filtrate then was ultrafiltered through a DDS GR90PP polysulfone membrane, which has approximately a 2000 MWCO. The retentate from the second ultrafiltration then was analyzed by gel chromatography utilizing a SUPERDEX column (Pharmacia) and a 0.5 molar sodium hydroxide mobile phase. Glucagon also was analyzed in the same way.

A molecular weight distribution of the lignin sample indicated that about 66 percent of the sample had a molecular weight which did not exceed the molecular weight of Glucagon, as determined under the same analytical conditions.

Skilled practitioners recognize that certain specific embodiments of the invention have been described with particularity herein, and that changes and modifications could be made to the invention described herein. These changes and modifications are to be considered as included within the purview of this application, which is limited only by the scope of the appended claims.

We claim:

1. A method of producing a lignin fraction of aqueous lignin solution useful in the preparation of lignin modified phenol-formaldehyde resin comprising ultrafiltering an aqueous lignin solution through two ultrafiltration membranes, one of said ultrafiltration membranes having a molecular weight cut-off of about 50,000 and one of said ultrafiltration membranes having a molecular weight cut-off of about 2,000, to produce a lignin fraction wherein more than 60 wt percent of the molecules of said lignin fraction have a molecular weight which does not exceed the molecular weight of Glucagon and more than 65 wt percent of the molecules of said lignin fraction have a molecular weight which does not exceed 5,000, as determined by gel chromatography, and wherein said aqueous solution is selected from the group consisting of black liquor, lignin solution, whole bagasse lignin, and blends thereof.

2. The method of claim 1 wherein said aqueous lignin solution is first ultrafiltered through the ultrafiltration membrane having a molecular weight cut-off of about 50,000 to obtain a filtrate and the filtrate is then ultrafiltered through the ultrafiltration membrane having a molecular weight cut-off of about 2,000, said lignin fraction being retained by said ultrafiltration membrane having a molecular weight cut-off of about 2,000.

3. A low molecular weight lignin fraction of aqueous lignin solution useful in the preparation of lignin modified phenol-formaldehyde resins, said lignin fraction comprising molecules of a lignin solution which, upon being subjected to ultrafiltration, pass through an ultrafiltration membrane having a molecular weight cut-off of about 50,000 and are rejected by an ultrafiltration membrane having a molecular weight cut-off of about 2,000 wherein in more than 60 wt percent of the molecules of said lignin fraction have molecular weight which does not exceed the molecular weight of Glucagon more than 65 wt percent of the molecules of said lignin fraction have a molecular weight which does not exceed 5,000, as determined by gel chromatography, and wherein the aqueous lignin solution comprises whole bagasse lignin.

4. The method of claim 1 wherein the aqueous lignin solution comprises black liquor.

5. The method of claim 1 wherein the aqueous lignin solution comprises whole bagasse lignin.

6. The method of claim 1 wherein the aqueous lignin solution comprises black liquor from kraft pulping of soft wood.

7. The method of claim 6 wherein the soft wood is southern pine.

8. The method of claim 1 wherein the aqueous lignin solution comprises black liquor from kraft pulping of hard wood.

9. A low molecular weight lignin fraction of aqueous lignin solution useful in the preparation of lignin modified phenol-formaldehyde resins, said lignin fraction comprising molecules of a lignin solution prepared by ultrafiltering an aqueous lignin solution through two ultrafiltration membranes wherein one of said ultrafiltration membranes has a molecular weight cut-off of about 50,000 and one of said ultrafiltration membranes has a molecular weight cut-off of about 2,000, to obtain a lignin fraction wherein more than 60 wt percent of molecules of said lignin fraction have a molecular weight which does not exceed the molecular weight of Glucagon and more than 65 wt percent of the molecules of said lignin fraction have a molecular weight which does not exceed 5,000, as determined by gel chromatography, and wherein the aqueous lignin solution comprises whole bagasse lignin.

* * * * *